(12) United States Patent
Grillenberger et al.

(10) Patent No.: US 9,496,770 B2
(45) Date of Patent: Nov. 15, 2016

(54) DYNAMOELECTRIC MACHINE COMPRISING A SELF-SUPPORTING HOUSING

(75) Inventors: Reiner Grillenberger, Windsbach (DE); Thomas Koch, Nürnberg (DE); Martin Sindelka, Nürnberg (DE); Ulrich Werner, Bubenreuth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 195 days.

(21) Appl. No.: 14/119,686

(22) PCT Filed: May 24, 2011

(86) PCT No.: PCT/EP2011/058406
§ 371 (c)(1),
(2), (4) Date: Nov. 22, 2013

(87) PCT Pub. No.: WO2012/159660
PCT Pub. Date: Nov. 29, 2012

(65) Prior Publication Data
US 2014/0117797 A1  May 1, 2014

(51) Int. Cl.
*H02K 9/14* (2006.01)
*H02K 1/20* (2006.01)
(Continued)

(52) U.S. Cl.
CPC *H02K 9/14* (2013.01); *H02K 1/20* (2013.01); *H02K 5/04* (2013.01); *H02K 5/20* (2013.01); *H02K 5/24* (2013.01); *H02K 9/00* (2013.01); *H02K 9/19* (2013.01); *H02K 1/185* (2013.01)

(58) Field of Classification Search
CPC ............ H02K 9/00; H02K 9/16; H02K 9/18; H02K 9/19; H02K 9/197; H02K 9/14; H02K 5/02; H02K 5/06; H02K 5/08; H02K 5/15; H02K 5/16; H02K 5/00; H02K 5/04; H02K 5/10; H02K 5/20; H02K 5/24
USPC ....... 310/52, 54, 58, 59, 64, 65, 60 R, 60 A, 310/89, 90
See application file for complete search history.

(56) References Cited

U.S. PATENT DOCUMENTS 3,165,655 A * 1/1965 Eis .................... H02K 5/128
310/54
4,363,987 A 12/1982 Vorotyntseva et al.
(Continued)

FOREIGN PATENT DOCUMENTS

AT       170766 B       3/1952
CH       317647 A       1/1957
(Continued)

*Primary Examiner* — Terrance Kenerly
*Assistant Examiner* — Alexander Singh
(74) *Attorney, Agent, or Firm* — Henry M. Feiereisen LLC.

(57) ABSTRACT

A dynamo-electric machine includes a self-supporting housing that has a laminated core section and at least one connecting section in the axial extension of the laminated core section. The laminated core section accommodates and secures, and at least sectionally surrounds all sides of, a laminated core of a stator. The individual sheets of the laminated core have a basic outer shape with an especially octagonal cross-section, a stator bore surrounded by radially arranged grooves which are evenly distributed along the circumference of the stator bore, a yoke back that radially adjoins the grooves and extends equidistantly from the stator bore, and axial cavities in the sheet, in regions between the yoke, back and the basic outer shape of the sheets.

12 Claims, 11 Drawing Sheets

(51) Int. Cl.
*H02K 5/24* (2006.01)
*H02K 9/19* (2006.01)
*H02K 5/04* (2006.01)
*H02K 9/00* (2006.01)
*H02K 5/20* (2006.01)
*H02K 1/18* (2006.01)

(56) References Cited

U.S. PATENT DOCUMENTS

| | | |
|---|---|---|
| 5,084,642 A | 1/1992 | Katsuzawa et al. |
| 5,365,132 A | 11/1994 | Hann et al. |
| 2005/0067905 A1 | 3/2005 | Maney et al. |
| 2006/0066159 A1 | 3/2006 | Enomoto et al. |
| 2006/0066169 A1* | 3/2006 | Daugherty ............... H02K 1/06 310/216.016 |
| 2007/0170788 A1 | 7/2007 | Werner |
| 2009/0026858 A1 | 1/2009 | Knauff |
| 2011/0140550 A1 | 6/2011 | Brandl et al. |

FOREIGN PATENT DOCUMENTS

| | | |
|---|---|---|
| DE | 1213040 B | 3/1966 |
| DE | 9112631 U1 | 2/1993 |
| DE | 19742255 C1 | 11/1998 |
| DE | 102006005316 A1 | 8/2007 |
| EP | 0387743 A1 | 9/1990 |
| RU | 2330369 C1 | 7/2008 |
| SU | 919016 A1 | 4/1982 |

* cited by examiner

DYNAMOELECTRIC MACHINE COMPRISING A SELF-SUPPORTING HOUSING

CROSS-REFERENCES TO RELATED APPLICATIONS

This application is the U.S. National Stage of International Application No. PCT/EP2011/058406, filed May 24, 2011, which designated the United States and has been published as International Publication No. WO 2012/159660.

BACKGROUND OF THE INVENTION

The invention relates to a dynamo-electric machine comprising a self-supporting housing that has a laminated core section.

A plurality of motor concepts exists for air and water cooling, for attaching the terminal box, for the arrangement of bearings and also for a concrete embodiment of the cooling of a dynamo-electric machine. Air cooling of a dynamo-electric machine is thus known from EP 0 387 743 A1. DE 197 42 255 C1 describes a three-phase machine without a casing having cooling pipes arranged in parallel with the axis in a stator laminated core. Furthermore, liquid-cooled electric machines are also known for instance from U.S. Pat. No. 5,084,642 A and DE 91 12 631 U1, wherein diversion pieces and inlet and outlet connecting pieces are cast into the bearing shields. An electric machine without a casing is also known from AT 170 766, the sheets of which have cooling and foot projections.

Electric machines without a casing have a lack of rigidity of the laminated core and are provided with pot bearing shields for mounting the shaft, said pot bearing shields being comparatively complicated to produce and thus comparatively expensive.

Dynamo-electric machines with casings result in an enlargement of the active part, since, inter alia, the cooling is not provided to the same degree as in a dynamo-electric machine without a casing.

SUMMARY OF THE INVENTION

On this basis the object underlying the invention is to avoid the afore-cited disadvantages. Taking into account in particular the new efficiency classes, a dynamo-electric machine, which is comparatively easy to produce, is furthermore to be produced, in particular at the low voltage level.

The solution of the set object is achieved by a dynamo-electric machine comprising a self-supporting housing, that has a laminated core section and at least one connecting section in the axial extension of the laminated core section. The laminated core section receives, secures, and at least sectionally surrounds all sides of a laminated core of a stator formed from axially layered sheets. The individual sheets of the laminated core have a basic outer shape with an especially octagonal cross-section having
- a stator bore surrounded by radially arranged grooves which are evenly distributed along the circumference of the stator bore,
- a yoke back that radially adjoins the grooves and extends equidistantly from the stator bore,
- axial recesses in the sheet, in regions between the yoke back and the basic outer shape of the sheets.

This dynamo-electric machine has a self-supporting housing, which has a simple angular laminated core section, including an angular laminated core. Furthermore, the self-supporting housing has at least one connecting section in the axial extension of the laminated core section. In the case of several connecting sections, these are advantageously arranged on both sides at the axial ends of the laminated core.

In accordance with the invention, the objects of the self-supporting housing are now clearly defined and summarized. A platform concept thus results, which now enables individual embodiments (for instance liquid cooling with noise attenuation and heat exchanger on the machine etc.) to be realized in a simple manner, without designing a new machine concept and constructively implementing the same.

This speeds up the lead times when ordering a machine for instance.

A platform concept for dynamo-electric machines is thus ensured in a simple manner. This is above all of particular interest for powerful machines in the low voltage range, in other words below 1000 V nominal voltage, since dynamo-electric machines are provided there for a variety of purposes.

The laminated core section of the self-supporting housing is thus used to fix the laminated core of a stator across the defined contact areas between laminated core section of the housing and laminated core. These contact areas are used in particular as torque supports and/or to package the laminated core. Similarly the short-circuit torques are to be accepted there.

In a further embodiment, the lateral surfaces of the laminated core section of the housing are open, so that only a frame, if necessary supported by one or more struts, fulfils the afore-cited objects. The laminated core section thus comprises a regular prism with reinforced edges and the contact areas in its most rudimentary basic spatial shape.

The connecting section of the housing is arranged directly on the laminated core section in the axial extension. The connecting section and laminated core section are advantageously embodied from one material, and in particular in one piece.

The self-supporting housing with its laminated core section and its connecting section is structured in an extremely simple manner and only consist of a few basic elements. These can be produced from steel, cast steel or grey cast iron or also from aluminum.

All connection possibilities of additional apparatuses and/or auxiliary devices, e.g. air guidance, air distribution, attachment of a fan, attachment of add-on coolers, bearing shields, terminal boxes etc, now take place exclusively by way of the one or the further connecting sections of the housing. With two connecting sections, the laminated core section is disposed between these two connecting sections. Functions and/or connection possibilities of the connecting section, which are not used, for instance on account of only an external cooling, and not an add-on cooler being provided, can be covered and/or closed by covers, blanking plugs and/or blanking covers on the connecting section.

This significantly simplifies the basic structure of the housing, since only one housing is now to be provided at an axis height of a dynamo-electric machine, with which all connection possibilities, cooling options etc. can be realized.

For instance, all cooling methods can thus be realized individually or in combination, like for instance self-ventilation or forced ventilation, water cooling or water cooling with forced ventilation, also as a separate add-on cooler. Depending on the installation site and climatic requirements, the dynamo-electric machine can thus be easily adjusted to the conditions with an optimal degree of efficiency.

In this way an air flow or a liquid is guided across the axial recesses of the sheet. In the case of liquid cooling, it is particularly advantageous for reasons such as making a good seal if tubes are provided in the recesses for this purpose, which are thermally connected to the laminated core. This is done for instance by means of thermally conductive casting material and/or caulking and/or axial injection and/or hydraulic expansion of the tubes in the recesses of the laminated core.

The recesses are arranged as a closed contour within the sheets between the yoke back and the outer edge or as cooling ribs and/or clamp recesses for tubes on the outer surface of the laminate core.

On account of the very simply structured housing with its connecting sections, the position of the terminal box can advantageously be almost freely selected, since the attachment of the terminal box is only bound to the connecting section and not to specific receiving surfaces, such as for instance in the case of a ribbed housing.

The laminated core of the stator is advantageously provided with an octagonal cross-sectional shape, wherein, when viewed in the peripheral direction, shorter and longer sides are arranged alternately. The peripheral direction is disposed on an imaginary plane, which is arranged at right angles to the virtual machine axis.

This cross-sectional shape simplifies inter alia the manufacturing process, particularly if one assumes that these sheets are stamped from wound sheet metal coils.

The sheets arranged axially one after the other and forming the laminated core of the stator advantageously comprise surface-enlarging structures, irrespective of the contact areas, on their outer sides. The cooling efficiency is thus increased.

The contact areas are advantageously provided on the shorter sides of the sheets and/or the laminated core, so that a predetermined distance can be set between a side wall of the laminated core section of the housing and a longer side of the laminated core. Noise damping mats can be placed into this free space for instance. In accordance with the invention, the minimized contact of the laminated core and the housing thus reduces the noise emissions of the dynamo-electric machine.

Furthermore, optimized material usage results from the inventive dynamo-electric machine with its self-supporting housing and its laminated core, since, unlike a round laminated core, the corners of the laminated core can now also be used. Furthermore, high rigidity results on account of the use of the self-supporting housing.

If the side walls of the laminated core section are closed, the laminated core is protected from spray water from all directions.

The use of this self-supporting housing in a dynamo-electric machine avoids pot bearing shields which are comparatively technically and financially costly. In accordance with the invention, less costly bearing shields are now arranged here in the connecting sections.

The laminated core of the stator advantageously has pressure plates applied to it on its front sides, said pressure plates axially pressing the individual axially layered sheets against one another.

According to one exemplary embodiment, the pressure plates in the region of the stator bore and/or grooves and also possible cooling recesses correspond to the dimensions of the sheets, but nevertheless have a larger outer diameter than the individual sheets. This is advantageous in that the pressure plates exclusively come to rest on the predetermined contact areas of the interior of the laminated core section of the housing. A free space between the surface of the laminated core and the interior of the laminated core section is thus produced between the sides of the laminated core, which advantageously comprise an octagonal basic shape with shorter and longer laminated core sides.

Damping materials can now be used in this free space, advantageously already pre-fabricated damping mats, which can be attuned to predetermined oscillation frequencies and noise frequencies of the motor and/or a converter connected to the motor and thus filter out specifically known frequencies.

The internal arrangement of the damping materials now protects these from external influences, such as weathering, aggressive media or mechanical damage and thus retains their function for longer. Furthermore, the damping mats are in a closed free space and can therefore not slip in the direction of the winding or the rotor on account of vibrations of the laminated core and thus reach the rotating masses.

The damping mats are advantageously glued, screwed or fastened by holding eyelets to the laminated core or to the interior of the laminated core section or to the interior of the housing cover plates, in other words the side walls. These damping mats result in a noise reduction, such as is of extreme importance particularly during operation of the dynamoelectric machine on the converter. These additional measures enable noise limit values to be retained without changes to the converter controller. Converters can thus continue to be operated with a low clock frequency on inventive dynamo-electric machines.

In a further embodiment, the pressure plates correspond to the sheets in terms of their cross-section. Therefore, the shorter sides of the laminated core and those of the pressure plates rest on the interior of the laminated core section of the housing in the contact areas provided therefor. Contact areas thus result between the surface of the laminated core and the interior of the laminated core section, said contact areas extending beyond the entire axial length of the laminated core. Damping materials, in particular damping mats with the afore-described advantageous effects can be inserted into the free spaces between the longer sides of the laminated core and the interiors of the laminated core sections of the housing corresponding thereto in the manner cited above.

BRIEF DESCRIPTION OF THE DRAWING

The invention and further advantageous embodiments of the invention are described in more detail below with the aid of basic exemplary embodiments, in which.

DETAILED DESCRIPTION OF PREFERRED EMBODIMENTS

Figure 1:
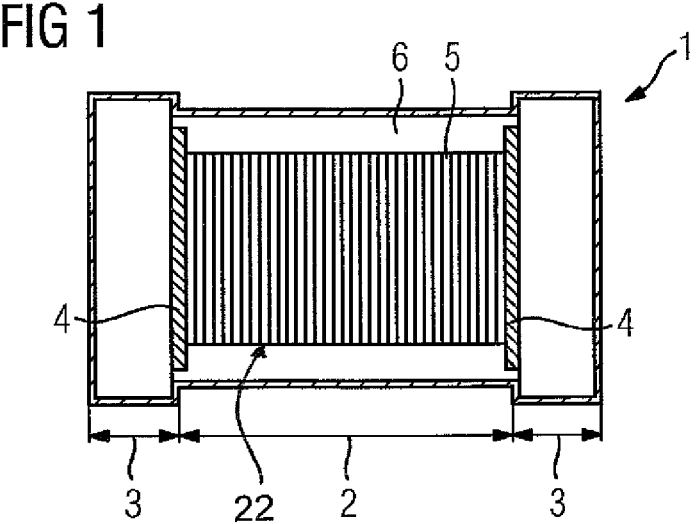
FIGS. 1, 2 show basic longitudinal sections of two embodiments.

FIG. 1 shows a basic representation of a longitudinal section of an inventive self-supporting housing 1 of a dynamo-electric machine 23, having a stator 22, the laminated core 5 of which is formed by pressure plates 4 on the end faces.

With the construction type of a self-supporting housing 1, the receiving sheets, reinforcements, profiles and paneling are non-detachably connected to one another using different joining technologies (soldering, welding, gluing), so that a single-piece housing 1 is produced. The supporting function is assumed here by the housing structure alone. The rigidity is achieved by the compact housing structure by if necessary hollow housing parts having the largest possible cross-section and thus a higher resisting torque. Beading, indentations etc., such as for instance in FIG. 21 and FIG. 25, increase the rigidity of the housing 1.

The pressure plates 6 package the laminated core 5 and press it axially together, so that extremely narrow gaps are produced between the individual sheets. Despite this, dust and/or moisture can enter this gap through capillary action. The housing 1 has a laminated core section 2 and connecting sections 3 adjoining axially thereto. In this representation, the connecting sections 3 and laminated core section 2 have different heights. The connecting sections 3 can similarly be embodied with the same cross-section, the same height or as also inferred from FIG. 1, with a larger cross-section.

In this case, the lower sections of the connecting areas 3 simultaneously form feet, on which the dynamo-electric machine 12 is to be operated. The laminated core 5 is, as indicated clearly in this representation, arranged within the laminated core section 2. The laminated core section 2 of the housing 1 has no further function or connection possibilities. It is used to position and if necessary protect the laminated core 5. For installation purposes, it is only advantageous if the connecting areas 3 and/or the laminated core section 2 provide means for attaching eyebolts 27, e.g. threaded inserts.

Figure 2:
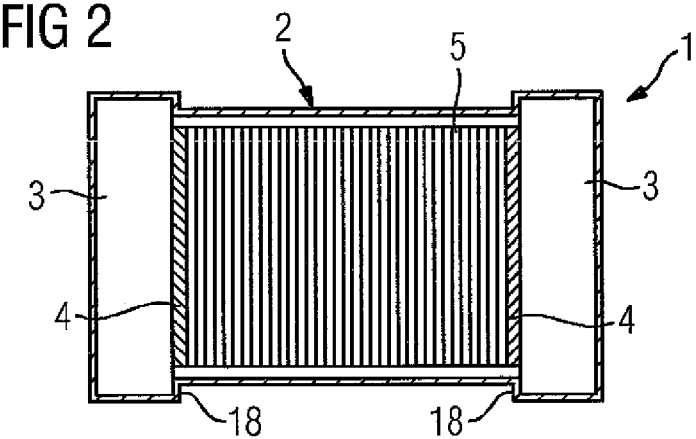

FIG. 2 shows a longitudinal section of a dynamo-electric machine 23, wherein the differences between this figure and FIG. 1 consist in the sheets of the laminated core 5, and also the pressure plates 4 having essentially the same diameter and a similar cross-section. The entire laminated core 5 is likewise arranged here in the laminated core section 2.

In FIG. 1, only the pressure plates 4 rest against the interior of the laminated core section 2 of the housing 1 in the provided contact areas 7. Whereas in FIG. 2, both the pressure plates and also the predetermined areas of the laminated core 5 rest against the contact areas 7 of the laminated core section 2, as can be seen in FIG. 3.

Figure 3:
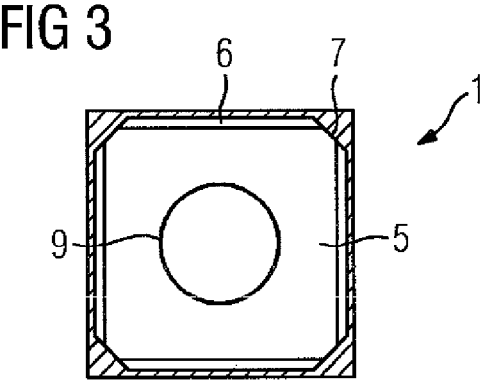
FIG. 3 shows a cross-section through an embodiment according to FIG. 1.

When viewed cross-sectionally in terms of its basic outer shape, FIG. 3 shows that the laminated core section 2 of the housing 1 can in particular be embodied to be square, octagonal or also to have further corners, in other words essentially as a polygon. The interior of the laminated core section 2 of the housing 1 forms an octagon, which, in particular at the shorter interior sides, forms contact areas 7 for the laminated core 5 and/or only for the pressure plates 4 of the laminated core 5.

Figure 4:
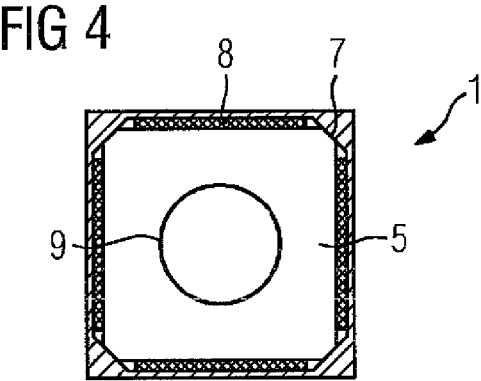
FIG. 4 shows a cross-section of an embodiment with damping mats.
Figure 5:
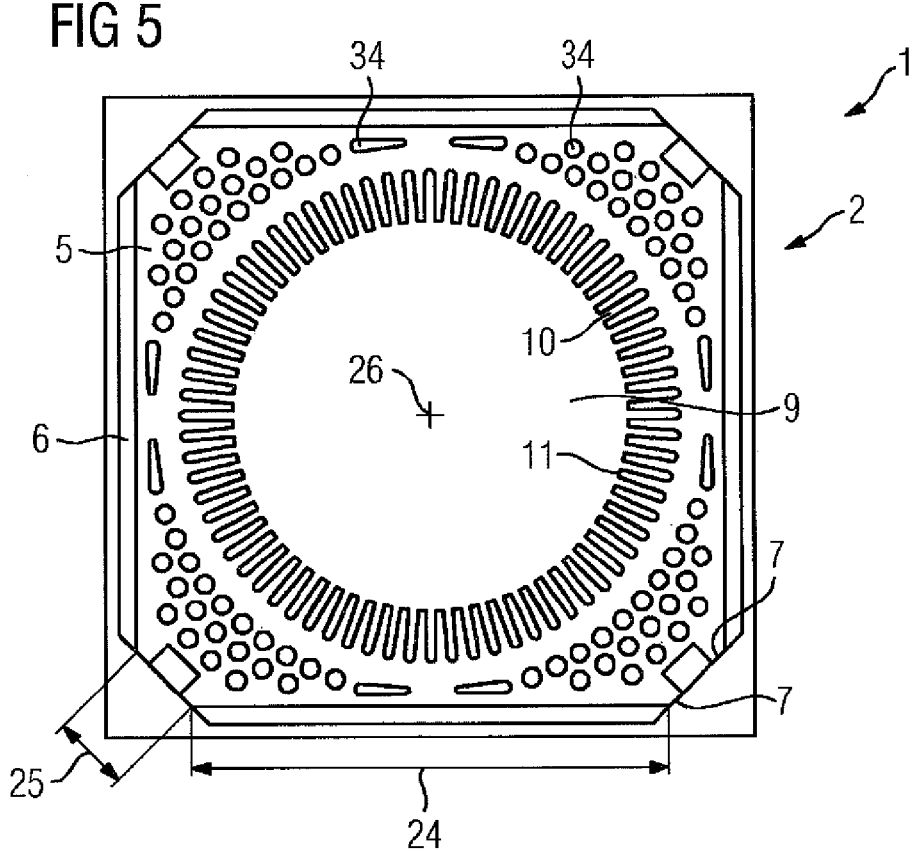
FIGS. 5 to 11 show embodiments of different laminated cores.
Figure 6:
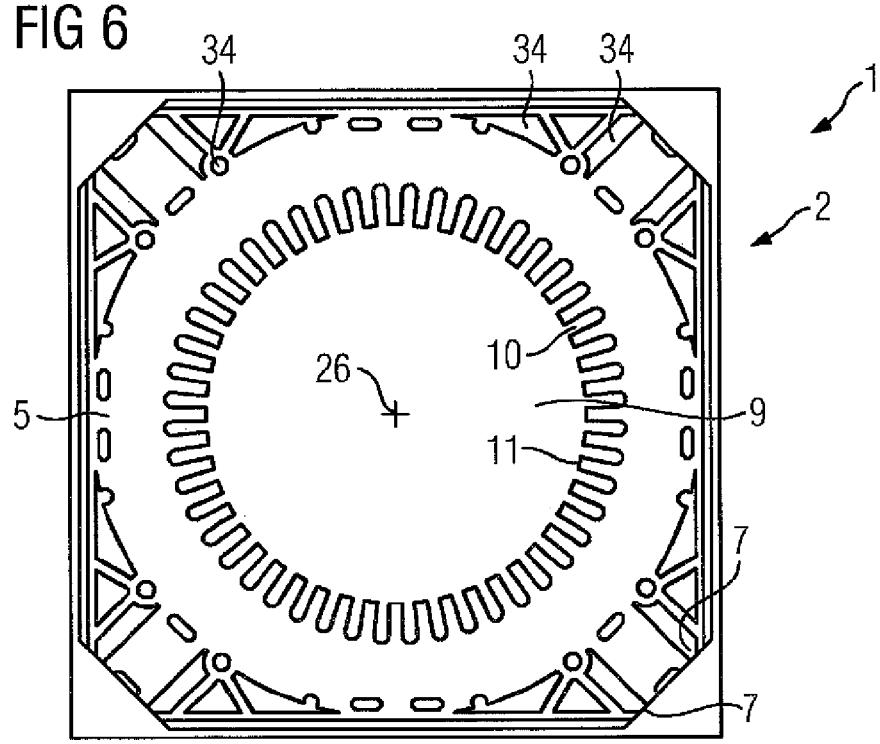

As shown in FIG. 4, prefabricated damping mats 8 are inserted into the resulting free spaces 6 between the interior of the laminated core section 2 and the surface of the laminated core 5, said damping mats 8 advantageously being attuned to certain frequencies in the converters supplying electrical energy to the dynamo-electric machine 23. The converter 17 can thus continue to be operated with a low clock frequency. The damping mats 8 have a very simple rectangular shape and can be obtained already prefabricated. They are not visible from the outside in the case of closed side walls of the housing 1. On account of the internal arrangement, the damping mats 8 are protected from external influences, such as weather or mechanical damage or slipping.

Furthermore, the damping mats 8 are advantageously fixed to the interior of the laminated core section 2 or laminated core 5 by means of glue, screw connections or additional holding eyelets, so that a slipping within the free space 6 is ruled out. This prevents the damping mats 8 from reaching the area of the winding of the stator 22 or rotating parts of the dynamo-electric machine 23. The damping mats can also be attached to the interior of separate side walls 38, such as for instance shown in FIG. 28.

FIGS. 5 to 11 show basic sheets of the laminated core 5 which is arranged in the laminated core section 2. The sheets basically have an octagonal basic shape, which, despite surface-enlarging measures such as notching, recesses on the outer periphery or within the sheet, remains unchanged. In this embodiment the octagonal basic shape has shorter sides 25 and longer sides 24, which alternate in the peripheral direction and thus allow for a positioning and fixing of the laminated core 5 across its shorter sides 25 and the contact areas 7 on the interior of the laminated core section 2 of the housing 1. The sheets basically have a stator bore 9, which is surrounded by grooves 10 and teeth 11 of the sheets. The sheets are arranged here at right angles to a virtual axis 26 in each instance.

The recesses 24 in the sheets and ultimately also in the laminated core 4, which run axially, are suited to receiving cooling tubes of a liquid cooling system of the dynamo-electric machine 23 and are used as ventilation channels for self-ventilation or forced ventilation. The cooling ribs 33 arranged on the outer periphery are embodied in particular by the design such that these are also suited as clamp recesses 38 for snap-in cooling tubes 37 of a liquid cooling system.

Figure 10:
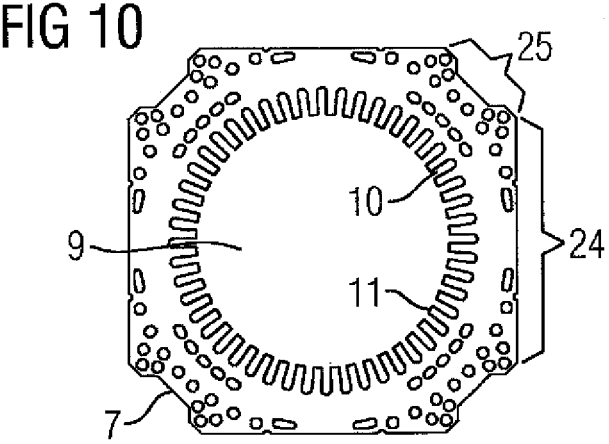
Figure 11:
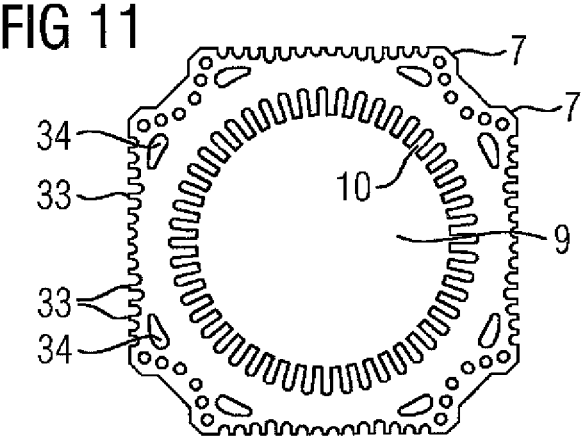

Irrespective of FIG. 10, the yoke back of the stator 22 is free of recesses, so that the field line curve of the magnetic field produced in the grooves 10 by a winding system is not negatively affected. An essentially annular area of the sheets is understood here to be a yoke back, said area radially outwardly adjoining the grooves.

The yoke back extends, without any recesses, preferably radially at least about a half groove depth.

In other words, the annular area of the yoke back has at least one value in its radial extension, which corresponds to half the groove depth of the respective sheet and/or laminated core.

FIG. 10 shows additional recesses in the area of the yoke back, which are arranged essentially opposite to the shorter side 25 in each instance. Existing heat sources can thus additionally be cooled.

Figure 7:
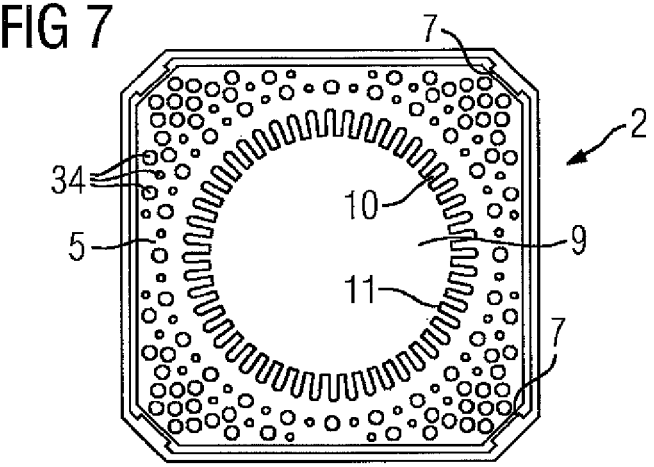
Figure 8:
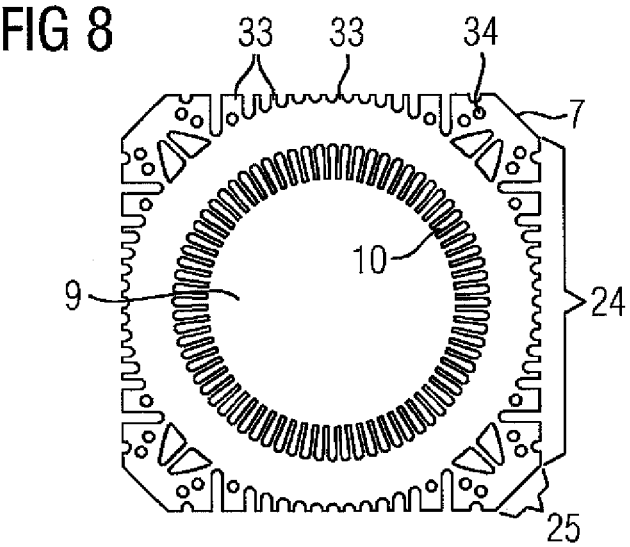
Figure 9:
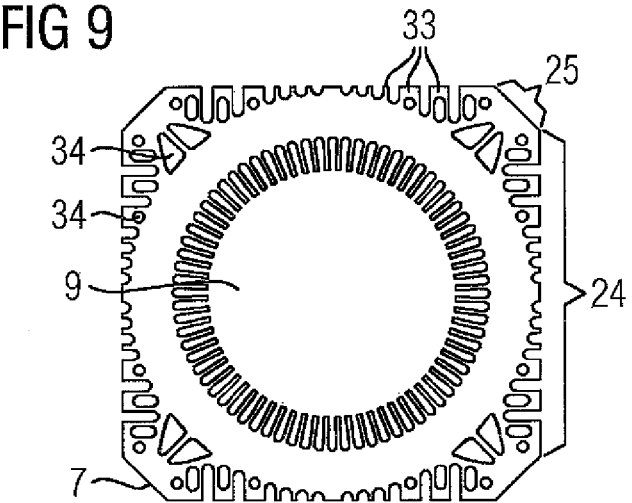
Figure 12:
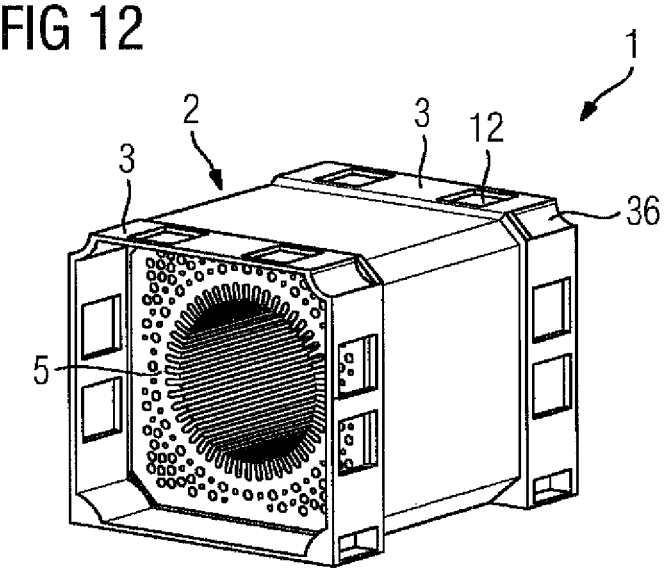
FIG. 12 shows a housing with a laminated core.

FIG. 12 shows a perspective representation of a laminated core 5 in the housing 1, wherein the laminated core 5 is formed from sheets according to FIG. 7. In this figure the laminated core 5 was axially introduced into the laminated core section 2 through a connecting section 3. Here the other connecting section 3 or the laminated core section 2 advantageously comprises an end stop, which provides a defined insertion depth of the laminated core 5 into the housing 1.

The connecting sections 3 have openings 12, which are inter alia suited to attaching cooling channels, terminal boxes etc. Furthermore, the connecting sections 3 furthermore have beads in their corners, which improve the rigidity of the housing 1.

Figure 13:
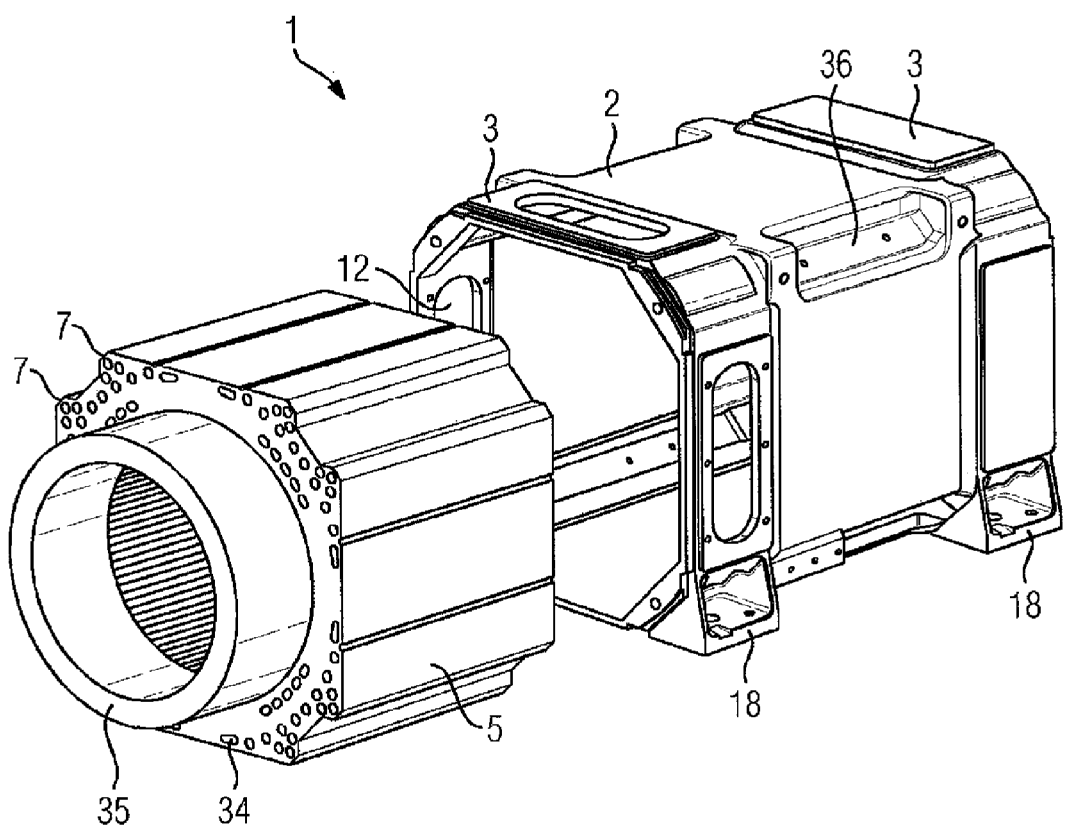
FIG. 13 shows a perspective representation.

FIG. 13 shows the assembly process on a housing 1 similar to FIG. 12, here the laminated core 5 is axially inserted into the housing 1 with a winding, not shown in further detail, and a protective hood 35, depending on the embodiment of the type of protection according to IEC 34-5.

Figure 14:
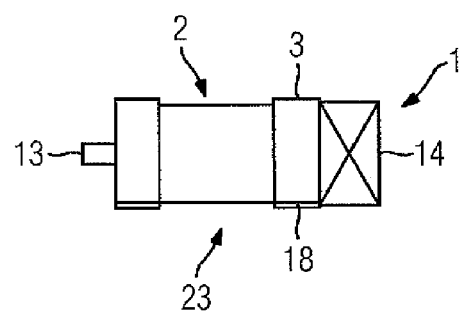
FIGS. 14, 15 show different arrangements of cooling apparatuses on a housing.

FIG. 14 shows, like the following FIGS., exemplary embodiments of the inventive concept, namely that the ventilation apparatus 14, terminal box 20 etc. can now only be attached by way of the connecting sections 3. FIG. 14 thus indicates a ventilation apparatus which can be connected axially to the connecting section 3. An external cooling of the dynamo-electric machine is thus possible for instance. The laminated core section 2 remains unaffected thereby.

Figure 15:
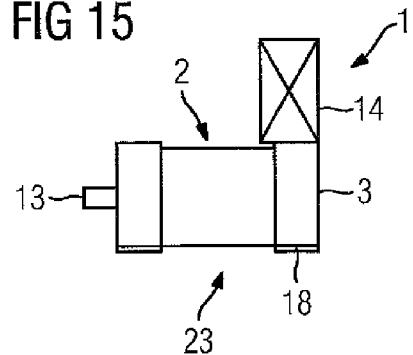

Furthermore, according to FIG. 15 a cooling apparatus or an external cooler can likewise be arranged above the connecting section 3.

Figure 16:
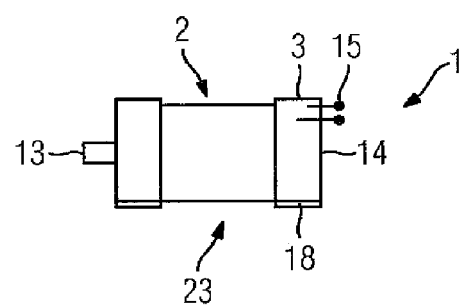
FIG. 16 shows a basic liquid cooling connection on a housing.

FIG. 16 shows the fundamental option of a connection 15 of a liquid cooling system on the dynamo-electric machine 23. Cooling tubes 27 are naturally to be arranged herefor in the recesses 34 (see in particular FIGS. 5 to 11) within the laminated core 5 or on the laminated core 5 of the stator 22 and connected in a flow-specific fashion to the front faces of the laminated core 5 within the connecting areas 3.

Figure 17:
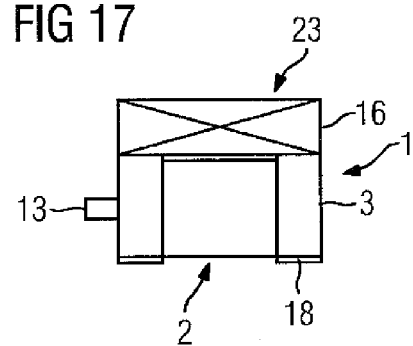
FIGS. 17, 18 show add-on coolers and/or add-on converters on a housing.

FIG. 17 shows, in a further embodiment, the housing 1 with its laminated core section 2 and the two connecting sections 3. The openings 12 of the connecting section 3 open into a heat exchanger 16, advantageously air-air or air-water heat exchanger, wherein the heated and/or back-cooled cooling air is discharged and/or fed by way of openings 12 in the connecting sections 3 of the dynamo-electric machine 23 which are provided herefor. The laminated core section 2 remains unaffected thereby.

Figure 18:
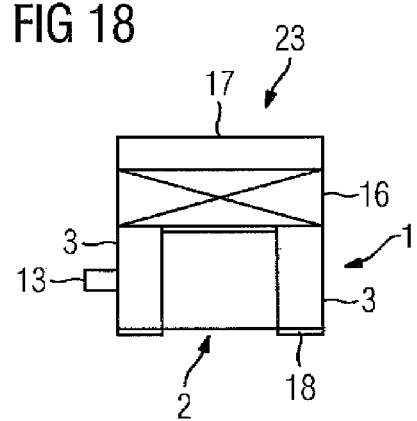

In addition to the embodiment according to FIG. 17, FIG. 18 shows a converter 17, which is positioned on the heat exchanger 16 or, together with the heat exchanger 16, forms a structural unit. The converter 17 is cooled here by the heat exchanger 16. The electrical connecting lines are supplied herefor through the heat exchanger 16 and via the connecting section 3 to the winding system of the stator 22 of the dynamo-electric machine 23.

Figure 19:
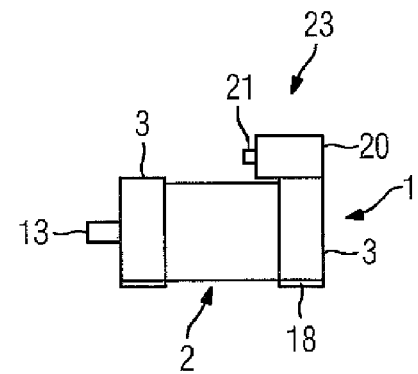
FIG. 19 shows the arrangement of a terminal box on the housing.

FIG. 19 shows a terminal box 20 on the connecting section 3, wherein the terminal box 20 with the alignment of its external electrical connection 21, which can be set in various directions by means of an, in particular, stoppable rotating mechanism.

All connecting elements such as terminal boxes 20, heat exchangers 16, converters 17 etc. can only be attached alone or in any combination to the connecting sections 3 and can be contacted with the winding, or cooling facilities of the dynamo-electric machine 23 etc. by way of the openings 12.

In order to realize the designs according to IEC 34-7, the required flanges, feet 18 etc. are now only provided on the connecting sections 3.

Figure 20:
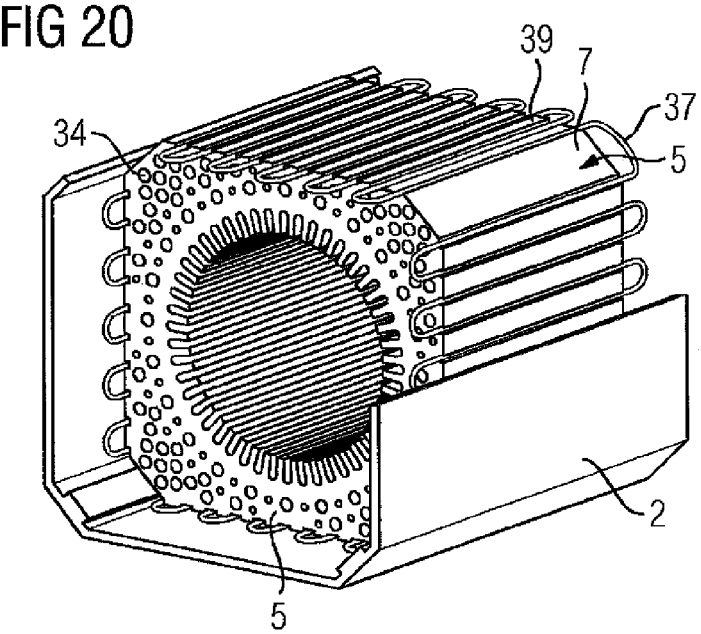
FIGS. 20, 21 show water cooling with different laminated cores.

FIG. 20 shows a cooling system arranged in a serpentine shape around the laminated core 5, the cooling tubes 37 of which are arranged on the periphery of the laminated core 5 in the clamp recesses 39. The further recesses 34 within the laminated core 5 are used above all for air cooling purposes. The laminated core section 2 is embodied to be essentially axially longer in this figure, for representational purposes, than the laminated core 5 in order to be better able to show the contact area 7.

Figure 21:
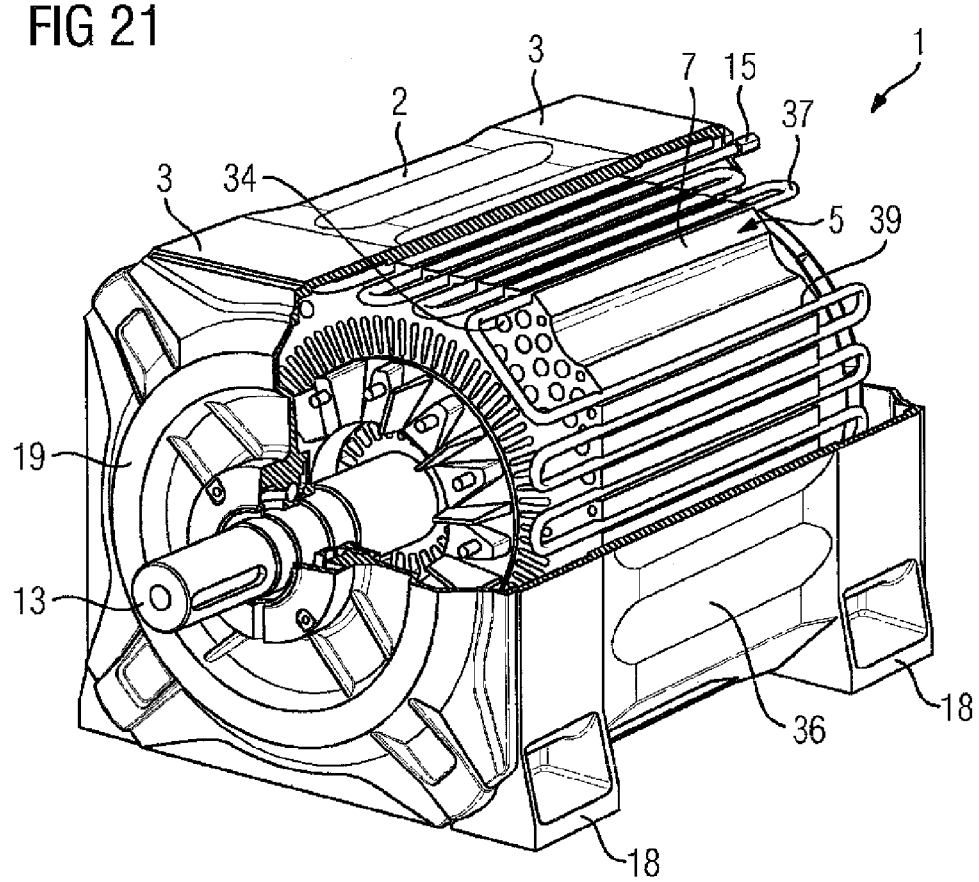

FIG. 21 shows, in a further representation, a cut-out housing 1, which provides bearing shields 19 on the connecting sections 3, into which a rotor is mounted. The rotor is in this case embodied as a short circuit rotor, it can for instance also be a permanently-excited rotor of a synchronous machine.

Similarly, as also shown in FIG. 20, a liquid cooling system is arranged on the periphery of the laminated core 5. The connection 15 for the liquid cooling system is disposed on the B-side of the dynamo-electric machine 23, in other words on the side facing the shaft end 13. For reasons of clarity, the stator 22 is shown without a winding system.

Beads 36 reinforce the laminated core section 2. Feet 18 are disposed in the connecting sections 3.

Figure 22:
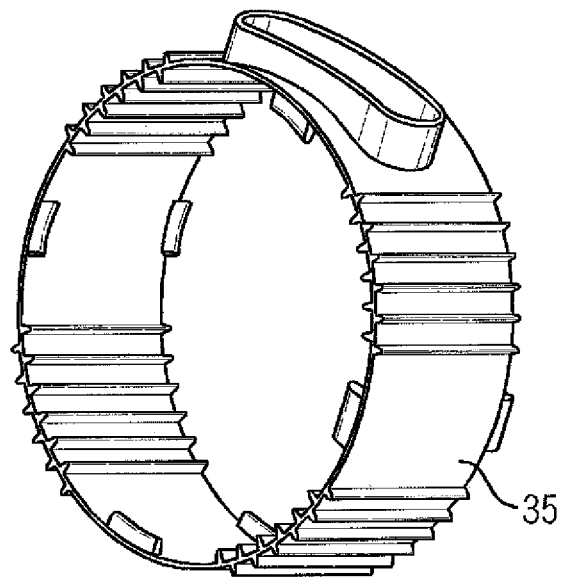
FIG. 22 shows a protective tube for cooling holes.
Figure 23:
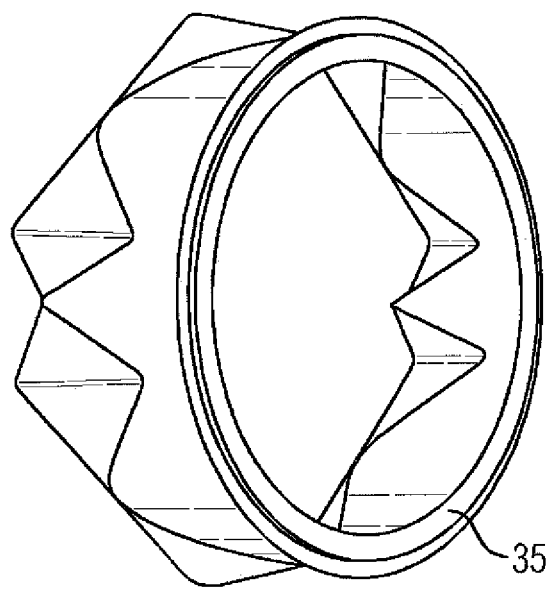
FIG. 23 shows a protective tube and cooling ribs.

FIGS. 22 and 23 each show protective hoods 35, which cover the winding system and/or the cooling tube 27 and thus protect against external influences depending on the requirements of the type of protection according to IEC 43-5. In these figures, ribs or beads reinforce the protective tube 35.

Figure 25:
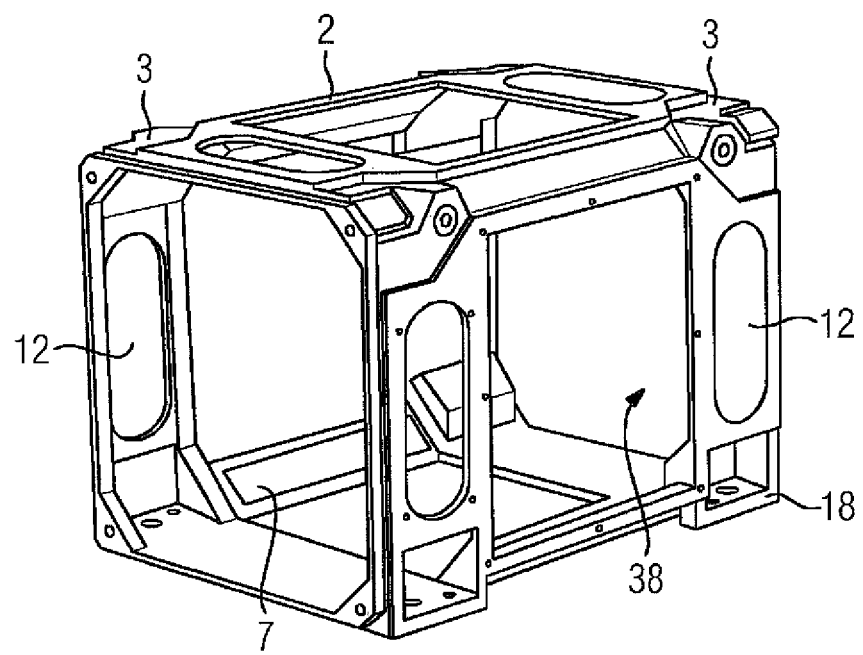

FIG. 25 shows a housing 1, in which the inventive basic idea has been retained compared with the previously described embodiments, but the side walls 38 remain open in the laminated core section 2. A comparatively higher rigidity compared with machines without casings is still achieved by this design.

The original side walls 38 can preferably be exchanged. Each gap can be sealed by various side walls. The oscillation properties of the housing 1 can be influenced by side walls 38 with other (plastic, glass fiber, steel . . . ) and/or thicker or thinner material. In a further embodiment, side walls 38 have an insert, which protrudes into the free space 6. These are for instance closed or perforated holding elements for damping material.

Figure 24:
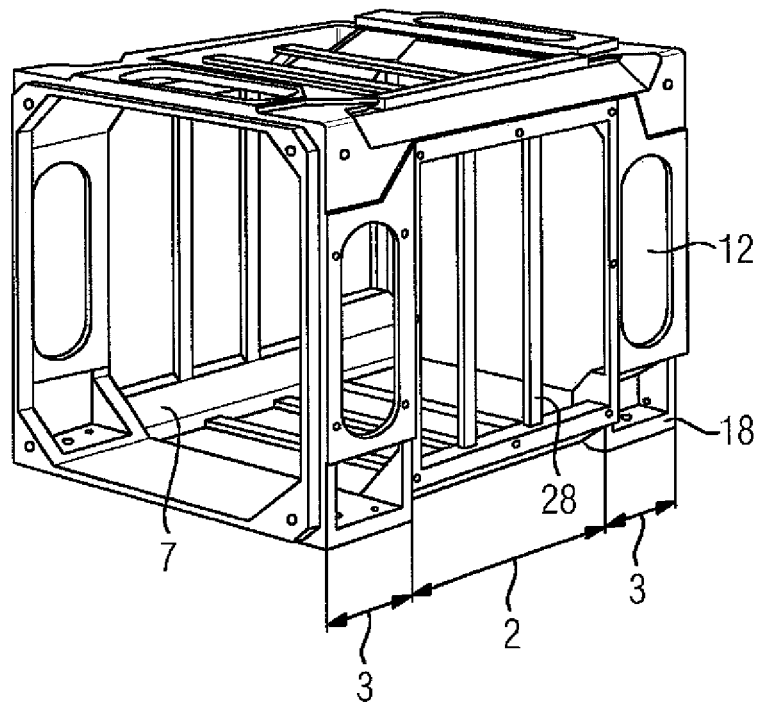
FIGS. 24 to 27 show further embodiments of the housing.

In order to further increase the rigidity, webs 28 are, if necessary, provided in the remaining openings of the open side walls, as shown in FIG. 24.

Figure 26:
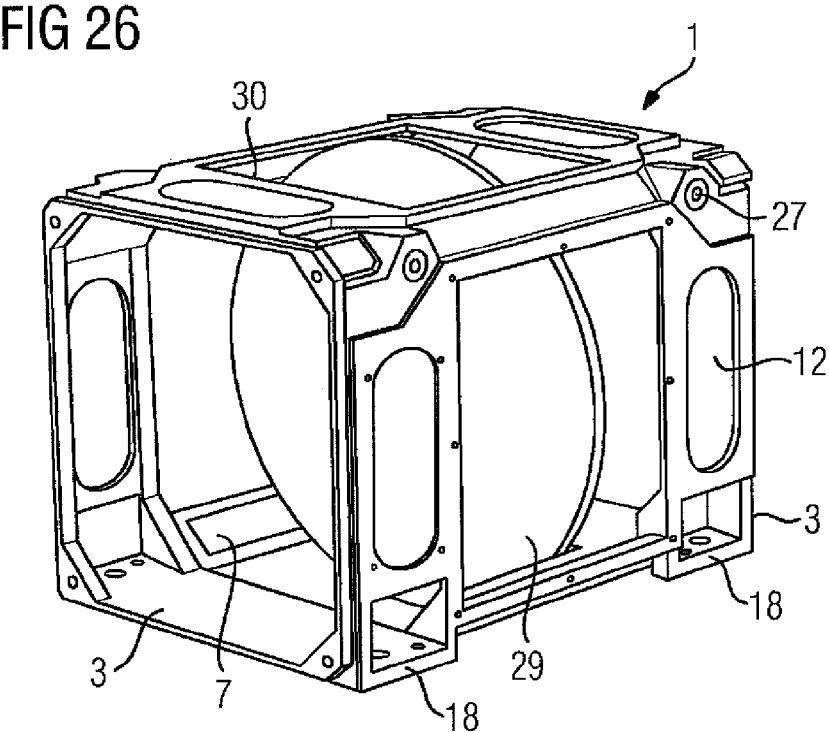

On account of the absence of side walls 38 of the laminated core section 2, the contact areas 7 can be particularly effectively processed for instance, as shown in FIG. 26, with a lathe tool, since the working areas 29 of a lathe tool of a machine tool project beyond the boundary edges 30.

Figure 27:
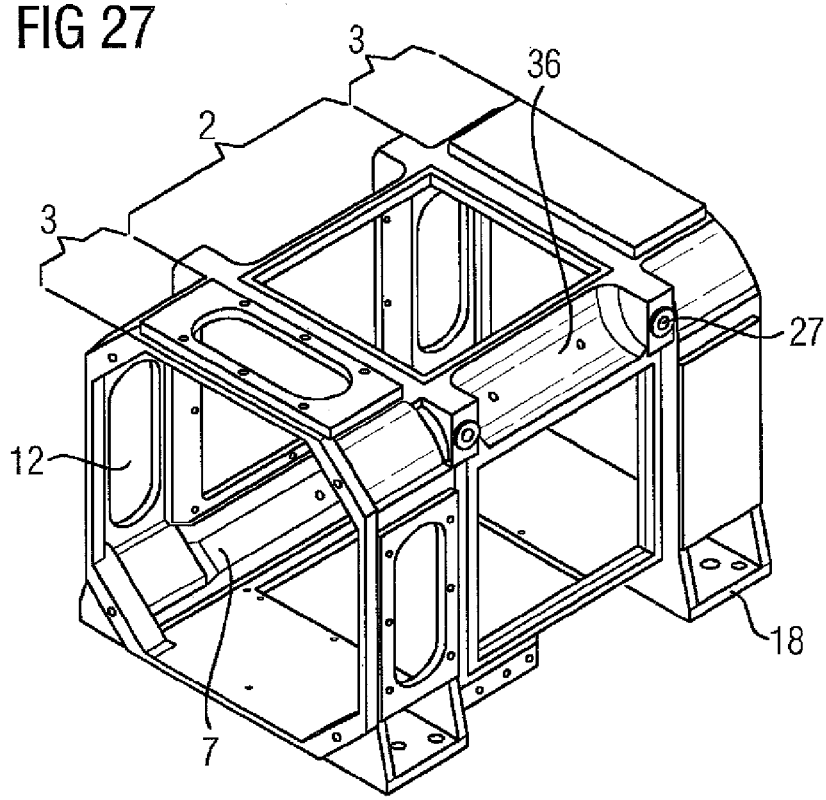

FIG. 27 shows a perspective representation of a housing 1, with open side walls, which has material accumulations at the axial ends of its laminated core section 2, which are particularly suited to attaching an eyebolt 27. An opening 12 in the right connecting section 3 is sealed for instance by a cover. The openings 12 not occupied by functional elements such as coolers, terminal boxes 20 can thus be covered such that the respective type of protection is preserved.

Figure 28:
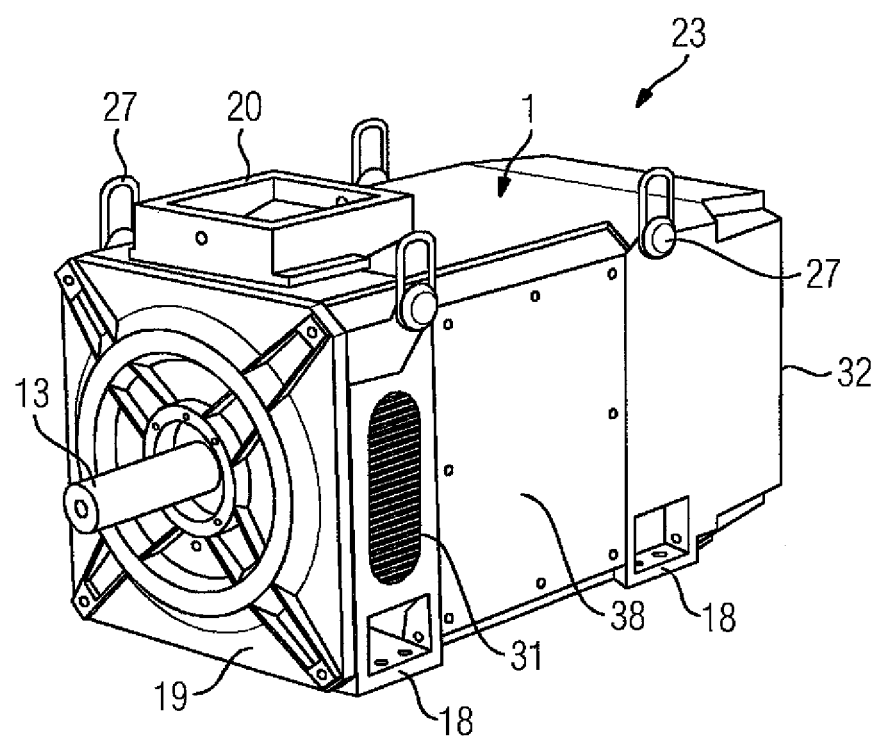
FIG. 28 shows a perspective representation of a dynamo-electric machine.

FIG. 28 shows a dynamo-electric machine 23 in a possible embodiment of the described platform concept, wherein a shaft end 13 protrudes from the one connecting section 3, said shaft end 13 being held in a bearing shield 19 in this connecting area 3. Furthermore, the openings 12 of this connecting area 3 are provided with a ventilation grid 31 and a terminal box 20. Similarly, eyebolts 27 are provided in the connecting sections 3. The other connecting section 3 has an axially aligned ventilation hood 32. The side wall 38 is sealed by screw connections.

The invention claimed is:

1. A dynamo-electric machine, comprising;
a self-supporting housing having a laminated core section and at least one connecting section in an axial extension of the laminated core section;
a stator having a laminated core received in the laminated core section and surrounded all-around by side walls of the housing which side walls have at least one closed or sealed area, said laminated core formed from axially layered sheets, said stator having a stator bore which is surrounded by radial grooves evenly distributed along a periphery of the stator bore;
a yoke back radially adjoining the grooves and extending equidistantly from the stator bore,
wherein the laminated core has an axial recess in a region between the yoke back and a basic outer shape of the sheets,
wherein the laminated core section of the self-supporting housing is constructed for fixing the laminated core of the stator across contact areas between the laminated core section of the housing and the laminated core of the stator,
wherein sheets which are arranged axially one after the other and form the laminated core of the stator are provided on their outer sides, irrespective of the contact areas, with surface increasing structures with recesses,
wherein the recesses are arranged as cooling ribs on outer surfaces of the laminated core of the stator without leaving an outer base contour of the sheets,
wherein the laminated core section of the housing is angular and the laminated core of the stator is also angular,
wherein the individual sheets have the outer base contour, and
wherein the laminated core section of the self-supporting housing is square and has four corners and a peripherally uninterrupted octagonal inner surface having four straight inner sides and four inclined inner sides connecting the straight inner sides with one another and extending over a whole length of the laminated core section of the self-supporting housing, the laminated core of the stator has a peripherally uninterrupted octagonal outer surface having four straight outer sides and four inclined outer sides connecting the straight sides with one another and extending over a whole length of the laminated core of the stator, and the laminated core section of the self-supporting housing fixes the laminated core of the stator across contact areas provided between the inclined inner sides of the laminated core section of the housing and the inclined outer sides of the laminated core of the stator over the whole length of the laminated core of the stator, and the laminated core section of the self-supporting housing has four side walls which are located outside of the laminated core of the stator and uninterruptedly covers the laminated core of the stator from outside, wherein the laminated core section of the self-supporting housing has an outer square surface and an inner octagonal surface extending uninterruptedly over its whole length.

2. The dynamo-electric machine of claim 1, wherein the outer basic shape of the sheets has an octagonal cross-section.

3. The dynamo-electric machine of claim 1, wherein the recess is embodied as a cooling rib or a clamp recess for a cooling tube.

4. The dynamo-electric machine of claim 1, wherein the laminated core has a plurality of said recesses suitable to receive plural cooling tubes.

5. The dynamo-electric machine of claim 1, further comprising a plurality of cooling tubes received in a plurality of said recess.

6. The dynamo-electric machine of claim 5, wherein the cooling tubes are configured to form a closed liquid circuit.

7. The dynamo-electric machine of claim 6, wherein the liquid circuit runs in a serpentine shape about the yoke back.

8. The dynamo-electric machine of claim 6, wherein the cooling tubes are configured to form at least two closed liquid circuits, with one of the closed liquid circuits running in a clockwise direction and with the other one of the closed liquid circuits running in a counter clockwise direction about the yoke back.

9. The dynamo-electric machine of claim 1, further comprising an air cooling for circulating air through the recess.

10. The dynamo-electric machine of claim 1, wherein the laminated core section has an inner side to define contact areas for the laminated core of the stator for positioning and fixing the laminated core.

11. The dynamo-electric machine of claim 10, wherein the stator has pressure plates respectively placed at end faces of the laminated core, said basic outer shape of the sheets and said pressure plates configured to define a short side and a long side, with only the pressure plates or the laminated core and the pressure plates resting with at least one section of their short sides, viewed in a peripheral direction, against the contact areas.

12. The dynamo-electric machine of claim 1, further comprising an add-on element selected from the group consisting of cooling system, terminal box, bearing shield, or cooling unit for stator or a rotor and connected exclusively via the connecting section of the housing.

* * * * *